UNITED STATES PATENT OFFICE.

WILLIAM C. SILLAR, OF BLACKHEATH, ROBERT G. SILLAR, OF BOLTON, AND CHRISTOPHER RAWSON, OF LONDON, ENGLAND.

IMPROVEMENT IN TREATING ANIMAL MATTER AND MANUFACTURING FERTILIZERS.

Specification forming part of Letters Patent No. 133,125, dated November 19, 1872.

*To all whom it may concern:*

Be it known that we, WILLIAM CAMERON SILLAR, of Blackheath, in the county of Kent, England, merchant, and ROBERT GEORGE SILLAR, of Bolton, in the county of Lancaster, England, gentleman, and CHRISTOPHER RAWSON, of No. 1 St. Swithin's Lane, in the city of London, England, general manager to the Native Guano Company, (limited,) subjects of the Queen of Great Britain, have invented or discovered new and useful Improvements in Treating Human and other Excreta and Animal Matters, in order to deodorize and decompose them and to convert them into inoffensive manure; and we, the said WILLIAM CAMERON SILLAR, ROBERT GEORGE SILLAR, and CHRISTOPHER RAWSON, do hereby declare the nature of the said invention, and in what manner the same is to be performed, to be particularly described and ascertained in and by the following statement thereof—that is to say:

Our invention consists in treating excreta or night-soil and animal matters with the substance known in England as "native guano," in order to convert such excreta, night-soil, or animal matters into inexpensive and inoffensive manure. "Native guano" is the precipitate obtained by treating sewage with deodorizing and precipitating mixtures, as described in the specifications of United States patents granted to William Cameron Sillar, Robert George Sillar, and George William Wigner, and dated 15th June, 1869, and to George William Wigner, and dated 25th October, 1870, and to Christopher Rawson, Philip Ovenden, James Wylde, William McCree, and Henry Hill, and dated 29th August, 1871, the subject-matters of the said patents constituting the process known in England as the "A B C process." Our invention relates, first, to the treatment of excreta or night-soil collected in privies, cess-pits, middens, dry-closets, or otherwise than by water carriage or sewers. One of the great difficulties attending the disposal of such night-soil or excreta is the nuisance ordinarily inseparable from the collection, removal, and storing of the same. Various plans for deodorizing excreta or night-soil have been tried; but they are either imperfect or inconvenient. Thus ashes are sometimes mixed with excreta, but do not deodorize and absorb them. Earth is sometimes used as a deodorant, but its use in towns is attended by great practical difficulties. Now, the objects of this part of our invention are not only to deodorize and absorb feces and urine and excreta generally, but to do this in such a way as to facilitate their use as a manure.

For this purpose we treat the said excreta with "native guano," the mode of using which depends upon the way in which the said excreta are collected. Where the excreta are collected in the ordinary way in privies the "native guano" may be strewed over the said excreta from time to time in sufficient quantity to cover them. Where the excreta are collected according to what is known as the "Goux system"—*i. e.*, in receptacles lined with the deodorant used—the "native guano" is used as such deodorant instead of earth, sawdust, or other matters. Where the excreta are collected in what are termed "dry-closets," the "native guano" is used in substitution for the dry earth or other matter which is usually distributed over the excreta; or where the receptacles used in such closets are divided into two compartments so as to separate the feces from the urine, the said "native guano" is distributed over the said feces by any suitable means, and is also put into the compartment in which the urine is collected so as to absorb the latter. The mixture of excreta and "native guano" when removed from the privies or other receptacles is made into heaps, with or without the further addition of "native guano," and in due time becomes a homogeneous mass, which is a valuable and inoffensive manure, which we term "native manure." Our invention further relates to the treatment of animal matters of all kinds, such as offal from slaughter-houses, refuse from knacker's yards, fish offal, the dead bodies of animals, and other animal matters or refuse which it is wished to deodorize and convert into manure.

The manufacture of manure from such matters as ordinarily conducted is expensive and inconvenient, involving, as it generally does, the use of chemicals and apparatus, and being attended by noxious odors, which render the manufacture a nuisance. Now, the objects of this part of our invention are to obviate these disadvantages and to utilize refuse animal matters and convert them into manure in an economical and inoffensive manner. For this purpose we treat such animal matters with "native guano," which we find to have the property of deodorizing, decomposing, and absorbing putrescent or putrescible animal matters. We mix a sufficient quantity of the "native guano" with such matters, or bury them in alternate layers of "native guano," and in due time the said "native guano" decomposes the said animal matters and absorbs their manurial properties, and the compound becomes a homogeneous mass, which is a valuable and inoffensive manure, which also we term "native manure."

Having now described the nature of our invention and the manner in which the same is to be performed, we claim as our said invention—

The use of the substance known as "native guano" for deodorizing, decomposing, and absorbing human or other excreta or night-soil, (as distinguished from sewage,) and animal matters, and converting them into inoffensive manure, essentially as described.

W. C. SILLAR. [L. S.]
    ROB. G. SILLAR. [L. S.]
    C. RAWSON. [L. S.]

Witnesses:
 PHILIP OVENDEN,
   1 St. Swithin's Lane, London.
 ARCH. FINDLAY,
   1 St. Swithin's Lane, London.